United States Patent [19]
Bennett et al.

[11] Patent Number: 5,358,227
[45] Date of Patent: Oct. 25, 1994

[54] MARINE ENGINE REPAIR STAND

[76] Inventors: Jonathan R. Bennett, 690 Joseph St., R.R. #1, Peterborough, Ontario, Canada, K9J 6X2; Reagh Mann, P.O. Fraserville, Ontario K0L 1V0, Canada

[21] Appl. No.: 24,468

[22] Filed: Mar. 1, 1993

[30] Foreign Application Priority Data

Mar. 11, 1992 [CA] Canada ............... 2062712-3

[51] Int. Cl.⁵ .................................. B23Q 1/04
[52] U.S. Cl. .......................... 269/68; 269/71; 269/296
[58] Field of Search ............ 269/45, 71, 296, 69-70, 269/61, 77, 78, 68; 294/86.41, 86.62, 86.6

[56] References Cited

U.S. PATENT DOCUMENTS

| | | | |
|---|---|---|---|
| 1,516,973 | 11/1924 | Loughran | 294/86.62 |
| 2,576,660 | 11/1951 | Williams | 269/71 |
| 3,971,485 | 7/1976 | Hoppey | 294/86.41 |
| 4,067,562 | 1/1978 | Weber | 269/71 |
| 4,262,891 | 4/1981 | Kinney | 269/71 |
| 4,294,440 | 10/1981 | Severt | 269/71 |
| 4,317,560 | 3/1982 | Troyer | 269/71 |
| 4,392,645 | 7/1983 | Westphal | 269/45 |
| 4,465,314 | 8/1984 | Parson et al. | 294/81.6 |
| 4,491,308 | 1/1985 | Walton et al. | 269/70 |
| 4,771,980 | 9/1988 | Dubbs et al. | 269/71 |

*Primary Examiner*—Robert C. Watson

[57] ABSTRACT

Disclosed herein is a device for mounting a portion of a marine engine comprising:
  a clamp mechanism to clamp the portion;
  a frame to carry the clamp mechanism;
  the clamp mechanism being arranged to be moved from a floor location to a working location above the floor.

9 Claims, 4 Drawing Sheets

MARINE ENGINE REPAIR STAND

BACKGROUND OF THE INVENTION

1. Field of the Invention

The present invention relates to marine engines and more particularly to devices for their repair.

2. Description of the Related Art

It is not uncommon to find a marine engine mechanic lifting a lower unit onto a conventional work bench and thereafter searching for a suitable method of positioning the engine on the work bench. Typically, he may use his bench vice as a means to support the lower unit. However, this technique is largely unsuitable in view of the fact that the lower unit casing is soft and prone to damage and the position obtained requires that the mechanic must work in an unconvenient position, causing back strain and discomfort.

Some efforts have been made to develop devices to support marine engines. However, the devices developed thus far are cumbersome, require the use of many attachments and are still unsuitable for the typical marine engine repair shop.

It is therefore an object of the present invention to obviate or mitigate the above mentioned disadvantages.

SUMMARY OF THE INVENTION

Briefly state, the invention involves a device for mounting a portion of a marine engine comprising:
a clamp mechanism to clamp the portion;
a frame to carry the clamp mechanism;
the clamp mechanism being arranged to be moved from a floor location to a working location above the floor.

BRIEF DESCRIPTION OF THE DRAWINGS

Several preferred embodiments of the present invention will now be described, by way of example only, with reference to the appended drawings in which.

DESCRIPTION OF THE PREFERRED EMBODIMENTS

Figure 1:
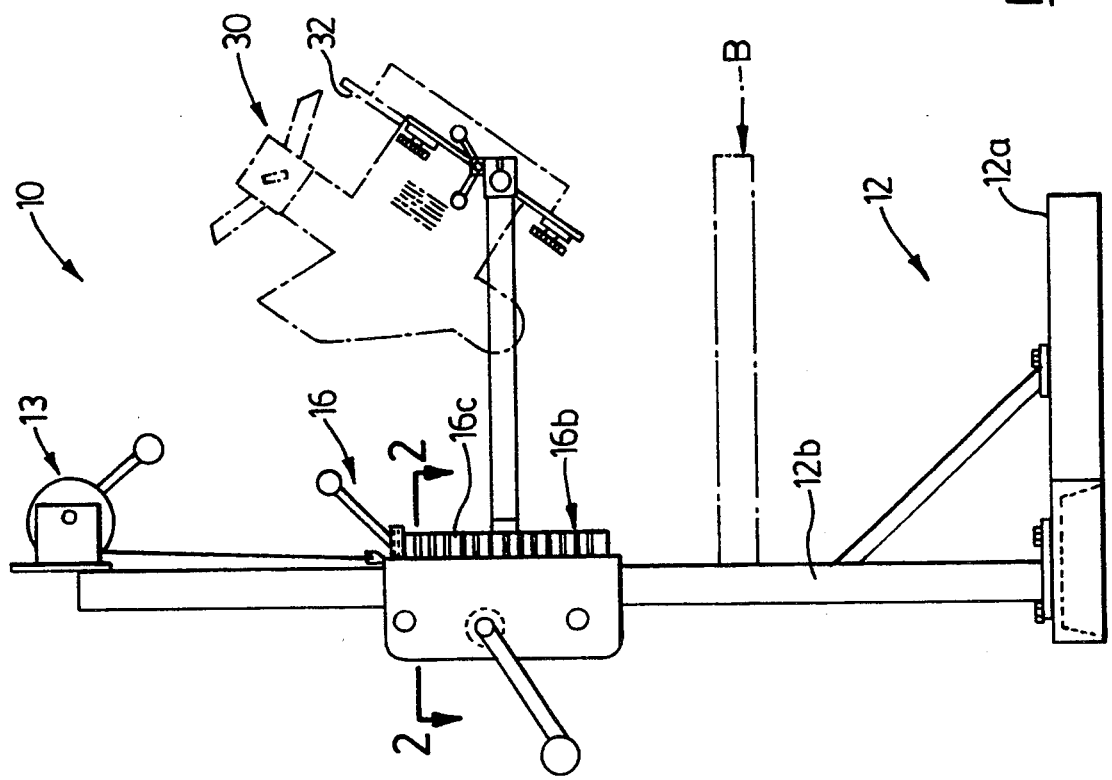
FIG. 1 is a side view of a marine ending repair stand.

Referring to the figures, there is provided a marine engine repair stand 10 having a floor mounted frame 12, including a base 12a and an upright member 12b. A carrier 14 is movable along the upright member 12b. An indexing mechanism 16 is rotatably attached to said carrier 14 and carries a pair of first support arms 18, each of which in turn carries a second support arm 20. Together the second support arms 20 secure the lower unit (shown by dashed lines at 30 in FIG. 1), of a marine engine on opposite sides thereof. Furthermore, the first support arms 18 and second support arms 20 permit the marine mechanic to position the lower unit in virtually any position necessary to repair the lower unit in relative comfort and safety.

The carrier 14 is movable from floor location (shown at dashed lines at B in FIG. 1) to a working location thereabove by use of a winch 13 positioned at the top end of the upright, the winch being joined to the carrier 14 by way of a cable 13a.

The carrier 14 has a 'U' shaped cross section with a back wall 14a and a pair of side walls 14b. Extending between the side walls 14b is a number of rods 14c that stabilize the carrier 14 against the upright member 12b. The inside width of the carrier 14 corresponds to the outside width of the upright member 12b so as to form a loose sliding fit therebetween. Located on one of the rods is an offset cam locking member 14d with a lever and which is arranged to bind between the rod and the upright member 12b should the cable or winch inadvertently release, thereby preventing damage to the lower unit or injury to the mechanic.

Figure 4:
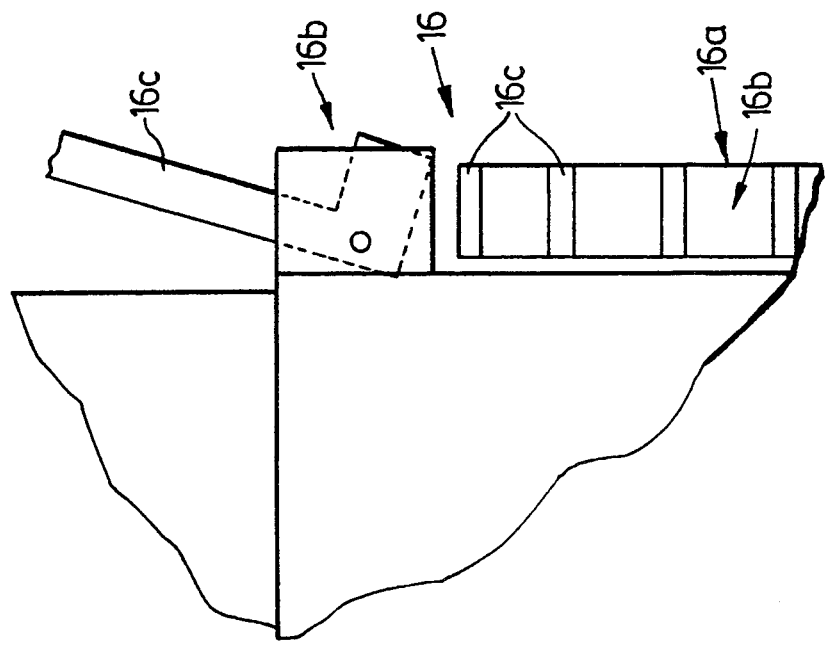
FIG. 4 is a fragmentary view of another portion of the stand illustrated in FIG. 1.
Figure 3:
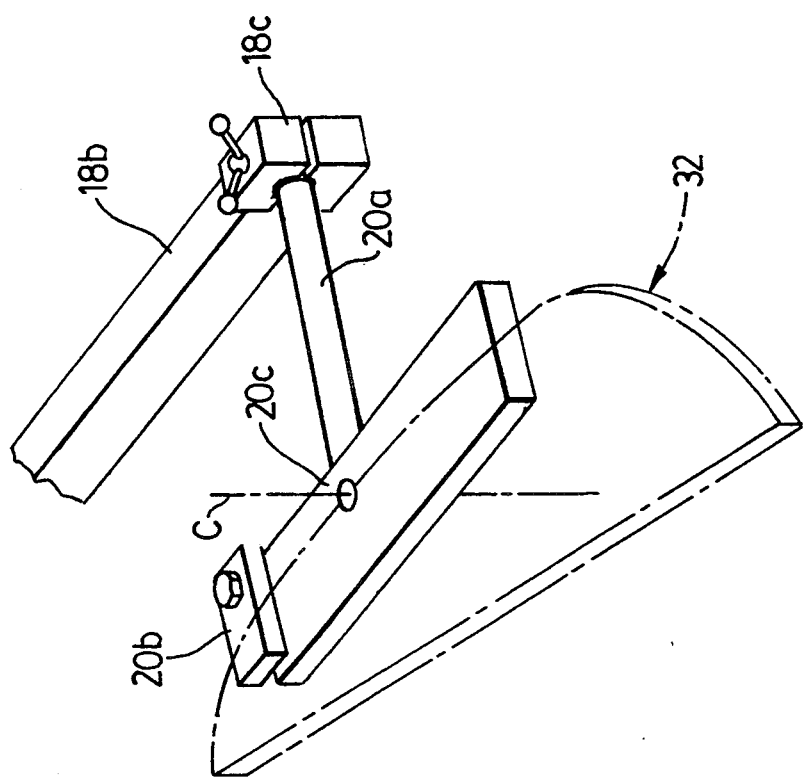
FIG. 3 is a magnified fragmentary view of one portion of the stand illustrated in FIG. 1.

As shown in FIG. 4, the indexing mechanism 16 includes an indexing plate 16a which is circular and has a notched periphery shown at 16b, that is with the number of notches formed thereon. A locking mechanism 16b is provided in the form of a locking lever 16c which is movable from a released position, enabling the indexing plate 16a to rotate, to a locked position with the locking lever engaged with any one of the notches 16c of the indexing plate 16a.

The indexing plate 16a is rotatably mounted to the carrier 14 by way of a rod illustrated at 16d for rotation about first axis 'A'. The indexing plate 16a has an outer surface to which is welded a pair of coplanar support arms 18. Each support arm 18 has a first portion 18a and a second portion 18b at right angles to the first portion 18a. Each support arm 18 has a free end carrying a block 18c with a bore therein and a threaded crank to squeeze the block 18c.

Figure 2:
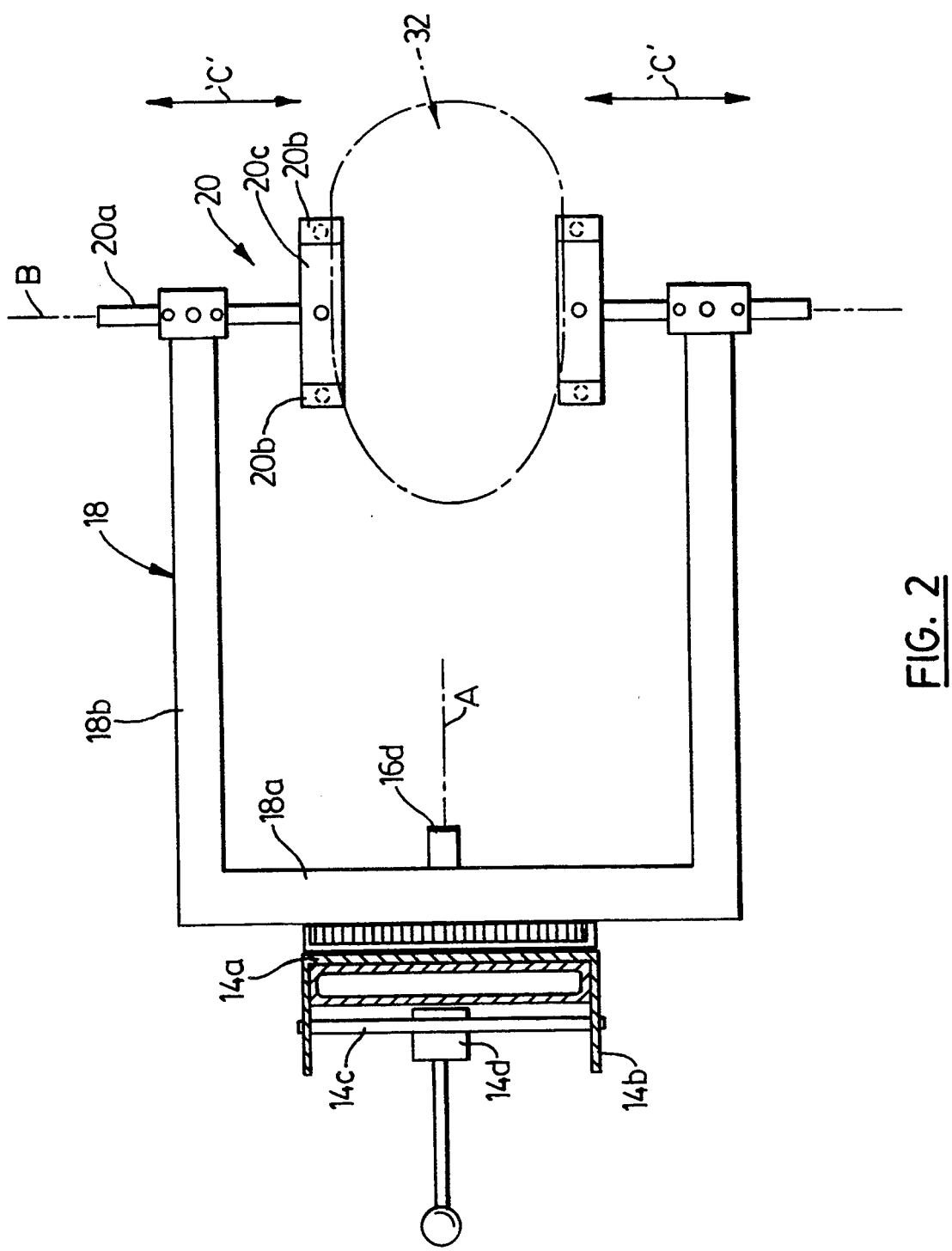
FIG. 2 is a sectional view taken of line 2—2 of FIG. 1.

Each second support arm 20 includes a rod 20a held within the bore for rotation about a second axis 'B' transverse to the respective first support arm and fixable therein by way of the crank. Each clamping arm 20 further includes several clamping fingers 20b which are mounted on a clamping plate 20c which is arranged for movement about a third axis 'C'. Each clamping finger 20b has a threaded crank permitting a portion of the lower unit, preferably the anti-cavitation plate (shown at 32 in FIG. 1) thereof, to be held between each clamping finger 20b and the clamping plate 20c. The clamping plate 20c is arranged to have a limited but sufficient rotational movement relative to the rod 20a in order to accommodate the various shapes of the anti-cavitation plate. Furthermore, the rod 20a is movable in the block 18c (as shown by the arrows 'C' in FIG. 2) to accommodate the different sizes the of the lower units.

While the discussion hereinabove has been restricted to the repair of the lower unit of the marine engine, it will be understood that the stand may be usable to support the entire marine engine, provided accommodation is made for the increased weight and other mounting limitations.

A worm and gear arrangement may replace the locking lever and the notched profile on the indexing plate. It should be recognized that the stand may also work effectively without the additional axis of rotation provided by the indexing plate.

There are other ways of moving the carrier 14 between the floor location and the working location, including hydraulic and screw arrangements.

Figure 5:
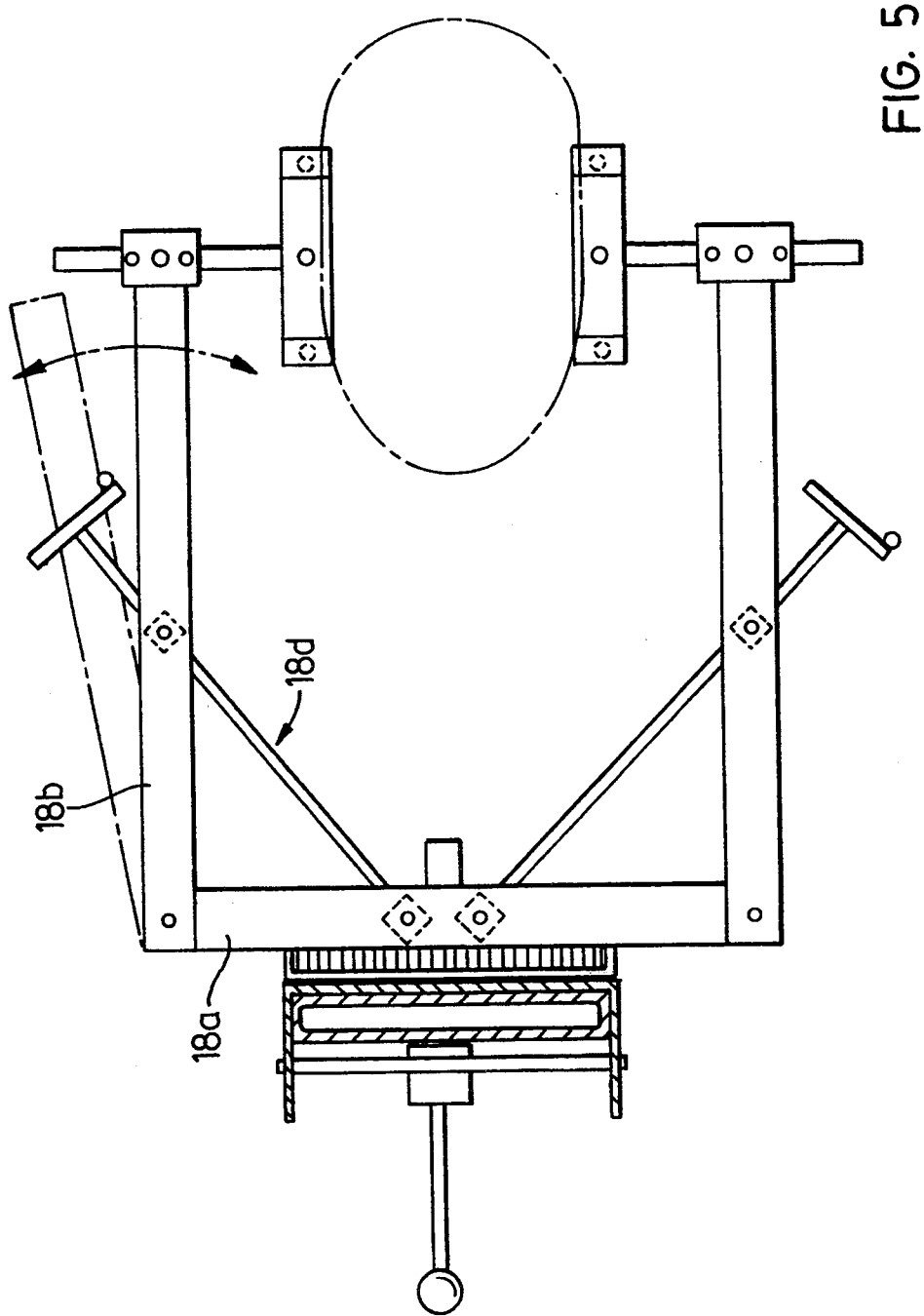
FIG. 5 is a sectional view taken according to line 2—2 of FIG. 1 of an alternative embodiment.

The first support arms may be suitable in configurations different than that shown above, including other angular positions. In addition, the first support arms may be articulated to provide further adjustment as the case may be, as for example shown in FIG. 5 wherein the portions 18a, 18b are pivoted together and whose angular orientation is controlled by a threaded screw arrangement as illustrated at 18d.

The second support arm 20 may be modified to use any one of a number of other industrial clamping techniques. It is important, however, that the lower unit be secured in such a manner that the anti-cavitation plate, or any other applicable mounting location, not be damaged as a result of being secured in the stand. In addition, the lower unit must be secured in such a manner as to prevent it from falling to the floor.

We claim:

1. A device repairing a marine engine of the type having a lower unit with an anti-cavitation plate, said device comprising:
   a clamp mechanism to clamp said anti-cavitation plate, said clamp mechanism including a pair of first support arms to extend on either side of said lower unit, each of said first support arms having a free end, a pair of second support arms, each of said second support arms coupled to the free end of a respective first support arm for movement in the direction of said lower unit, each of said second support arms having a free end, a pair of clamping plates, each of said clamping plates being coupled to the free end of a respective second support arm and oriented to extend along said anti-cavitation plate, at least one clamp member for clamping said anti-cavitation plate against each of said clamping plates; each of said second support arms being rotatable relative to the respective first support arm to permit said second support arms to be rotated about an axis transverse to said first support arm, thereby permitting said lower unit to be swung to an working position;
   a frame to carry said clamp mechanism; said frame including an upright member, a carrier movable along said upright member to move said clamp mechanism from a floor location to a working position above said floor location.

2. A device as defined in claim 1 wherein each of clamp plates is pivotally connected to the free end of a respective second support arm, thereby to permit the position of said clamping plate to be changed relative to said anti-cavitation plate to accommodate different shaped anti-cavitation plates.

3. A device as defined in claim 2 further including an indexing mechanism joining said first support arms to said carrier and permitting said support arms to be rotated about a first axis.

4. A device as defined in claim 3 wherein each of said first support arms include a block at said free end, each of said second support arms includes a rod, said rod being removably secured in said block to rotate on a second axis perpendicular to said first axis.

5. A device as defined in claim 4 wherein each of said clamping members further includes a clamping finger, each of said fingers being mounted on said clamping plate, said clamping plate being pivotally mounted on said second support arm in order to pivot on a third axis.

6. A device as defined in claim 3 wherein said indexing mechanism includes a plate carrying said first support arms, said plate being rotatably mounted to said carrier and a locking mechanism to lock said plate in position.

7. A device as defined in claim 6 wherein said plate has a peripheral edge with a number of notches formed therein, said locking mechanism includes a lever pivoted to said carrier and engageable with any one of said notches to inhibit rotation of said lower unit about said first axis.

8. A device as defined in claim 1 wherein said carrier has a u-shaped cross section formed from a pair of flanges on either side of a web, said flanges being spaced from one another a distance greater than the width of said upright member, said carrier further including a number of rods extending between said flanges and opposite said web to stabilize said carrier against said upright member.

9. A device for repairing a marine engine of the type having a lower unit with an anti-cavitation plate, said device comprising:
   a clamp mechanism to clamp said anti-cavitation plate, said clamp mechanism including a pair of first support arms to extend on either side of said lower unit, each of said first support arms having a free end, a pair of second support arms, each of said second support arms coupled to the free end of a respective first support arm for movement in the direction of said lower unit, each of said second support arms having a free end, a pair of clamping plates, each of said clamping plates being coupled to the free end of a respective second support arm and oriented to extend along said anti-cavitation plate, at least one clamp member for clamping said anti-cavitation plate against each of said clamping plates; each of said second support rams being rotatable relative to the respective support arm to permit said second support arms to be rotated about an axis transverse to said first support arm, thereby permitting said lower unit to be swung to an working position; a frame to carry said clamp mechanism; said frame including an upright member, a carrier movable along said upright member to move said clamp mechanism from a floor location to a working position above said floor location; each of clamp plates is pivotally connected to the free end of a respective second support arm, thereby to permit the position of said clamping plate to be changed relative to said anti-cavitation plate to accommodate different shaped anti-cavitation plates further including an indexing mechanism joining said support arms to said carrier and permitting said support arms to be rotated about a first axis; each of said first support arms including a block at said free end, each of said second support arms including a rod, said rod being removably secured in said block to rotate on a second axis perpendicular to said first axis; each of said clamping members further including a clamping finger, each of said fingers being mounted on said clamping plate, said clamping plate being pivotally mounted on said second support arm in order to pivot on a third axis; said plate having a peripheral edge with a number of notches formed therein, said locking mechanism including a lever pivoted to said carrier and engageable with any one of said notches to inhibit rotation of said lower unit about said first axis.

* * * * *